METHOD OF IMPROVING THE SIGNAL TO NOISE RATIO OF THIN FILM SEMI-CONDUCTOR THERMISTORS

Filed Sept. 11, 1963 2 Sheets-Sheet 1

INVENTOR.
BRUCE NORTON
BY
Robert L. Norton
ATTORNEY

June 7, 1966 B. NORTON 3,255,054

METHOD OF IMPROVING THE SIGNAL TO NOISE RATIO OF THIN FILM SEMI-CONDUCTOR THERMISTORS

Filed Sept. 11, 1963 2 Sheets-Sheet 2

INVENTOR.
BRUCE NORTON

BY

Robert Ames Norton

ATTORNEY

United States Patent Office 3,255,054

Patented June 7, 1966

3,255,054

METHOD OF IMPROVING THE SIGNAL TO NOISE RATIO OF THIN FILM SEMI-CONDUCTOR THERMISTORS

Bruce Norton, Westport, Conn., assignor to Barnes Engineering Company, Stamford, Conn., a corporation of Delaware Filed Sept. 11, 1963, Ser. No. 308,117
6 Claims. (Cl. 148—133)

This invention relates to a process for improving or restoring a high signal-to-noise ratio to thin film thermistor bolometers of germanium or silicon.

Thin film thermistor bolometers of germanium or silicon are described in the patent to DeWaard 2,994,053, July 25, 1961. The thermistors are thin films of germanium or silicon, for example, films of from .3$\mu$ to 1$\mu$. In general, they are prepared by vacuum deposition, and appear to be polycrystalline in nature. The thermistor bolometers thus produced show good responsivity with quite short time constants, and permit operation at relatively high bias voltages, considerably higher than is safe with the ordinary type of oxide thermistor bolometers in which the active material is a mixture of oxides of manganese, nickel, and sometimes cobalt.

The detectivity of the thin film thermistor bolometers varies, of course, with the noise in the bolometer, and unfortunately, there is a considerable variation in the signal-to-noise ratios of various bolometers produced. The efficiency of thin film thermistor bolometers would be markedly increased if it were possible to increase the signal-to-noise ratio.

Another problem is presented by the fact that although the thin film thermistor bolometers show extraordinary durability under quite high bias voltages, it is possible to damage a thermistor bolometer. This is not surprising in view of the extreme thinnes of the film. Occasionally a bolometer is damaged, for example by rough handling, and this often shows up as an enormous increase in the noise. Such damaged bolometers develop so much noise that long before bias voltages are reached which would give useful signals, the signal is completely swamped by the noise. In other words, these bolometers have no practical utility. If it were possible to restore the damaged bolometers to their original signal-to-noise ratio, this would constitute a marked saving. It is an advantage of the present invention that in a great many cases it is possible to bring back the original signal-to-noise ratio of damaged bolometers.

Essentially the process of the present invention involves a long heating at moderate temperature with a reasonable bias voltage applied to the thermistor bolometer. Signal-to-noise ratio increases of 300% and more can be achieved. It is also possible to restore the original high signal-to-noise ratio of bolometers which have been damaged so that they have become excessively noisy, without, however, having been physically and grossly broken in pieces.

It is an advantage of the present invention that the improved results are obtained without extremely critical operating conditions. Thus, for example, the temperature can range from somewhat below 50° C. to a temperature as high as a bolometer will stand, for example, about 150° C. In general, the effect of the present invention is obtained at quite moderate temperatures, for example, 65–85° C. Higher temperatures, such at 135° C. do not give higher signal-to-noise ratios, but they do permit obtaining optimum results in a somewhat shorter heating time.

The time of heating is also not critical. However, it, is fairly long. At 75° C. signal-to-noise ratios increase reaching a useful maximum in the region of 48 hours. Less than 24 hours is generally insufficient to produce the maximum gain in signal-to-noise ratio. There is no objection to longer heating, no deterioration having been shown in heating times up to 96 hours or more, but since there is no advantage, and the longer heating time merely adds to the cost, it is preferred to heat only for long enough to obtain a practical optimum result, which, as has been pointed out, at 75° C. is usually about 48 hours.

The bias voltage to be used is also not critical. When no bias voltage is used, the gain in signal-to-noise ratio is not significant. As the voltage is increased, the gain in signal-to-noise ratio rises rapidly with voltages of from about 100 to 150 volts, but is not sharply critical. The upper limit is, of course, set by the peak voltage which a particular bolometer can stand at the temperature used and naturally, as is good practice, the voltages are maintained at much lower figures.

It is preferred to use D.C. bias during the slow heating. However, the invention is not limited to the use of D.C. bias, and low frequency A.C. bias is also included. In the case of A.C. bias, care should be taken to keep the peak voltage, not the R.M.S. voltage, below the point at which the risk of damage to the bolometer occurs.

Many bolometers which by reason of rough handling or other accidents, have developed very high noise, can also be restored to their original signal-to-noise ratio by the same treatment as has been described above for improving the signal-to-noise ratio of good bolometers. Ordinarily the signal-to-noise ratio of a restored bolometer will not be greatly higher than its original signal-to-noise ratio, particularly if the bolometer was a good one initially. However, as the damaged bolometer may often have a noise much greater than the signal, the precentage increase is, of course, enormous.

The invention is not intended to be limited to any particular theory of why the increase in the signal-to-noise ratio is obtained. It seems probable that in the slow heating under bias there is a rearrangement of the crystal structure in the polycrystalline film, thus changing its electrical properties. In general, the improvement is produced more by reducing noise than by increasing responsivity. The rearrangement of crystal structure, while plausible, is only advanced as a possible explanation of the results obtained with the present invention, without limiting the invention thereto. It is, of course, quite possible that other factors also are involved.

The invention will be described in greater detail in conjunction with the following typical examples and with the drawings in which.

EXAMPLE 1

Figure 1:
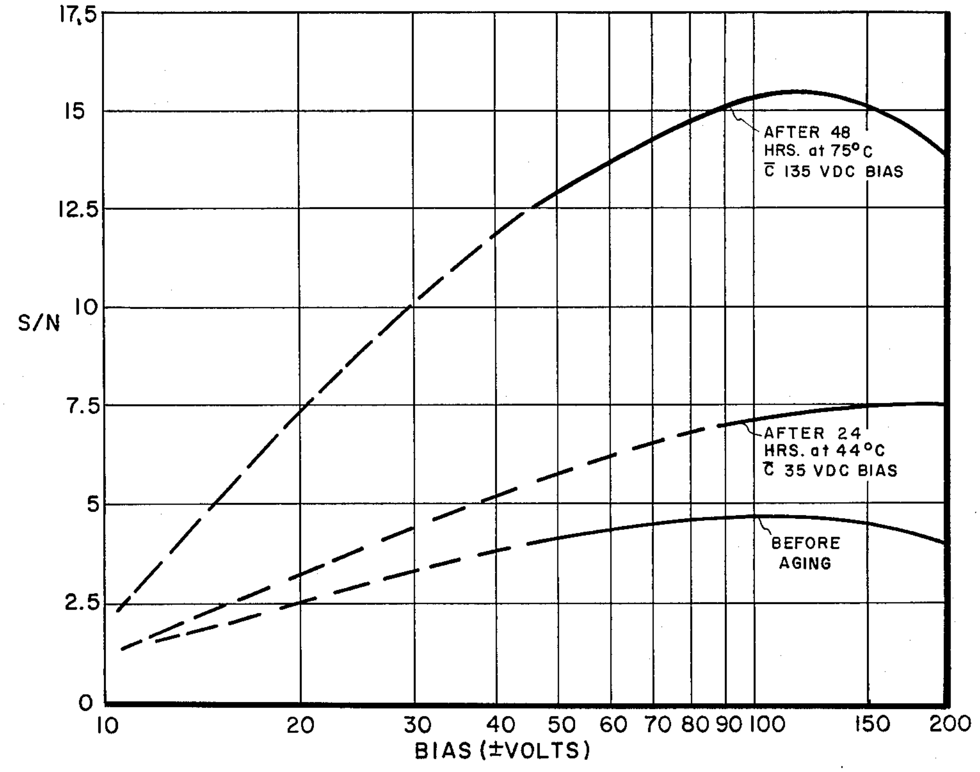
FIG. 1 is a series of curves of a good bolometer heated at 75° C. under a D.C. bias of approximately 135 v.

A 1 mm. square thin film germanium bolometer was measured in the customary manner by irradiation from a 470° K black body, producing an irradiation on the bolometer of 14.48 $\mu$w./mm.$^2$. The standard test chopping rate of 15 c.p.s. was used with a 50% duty cycle. The bias voltage was gradually increased and the signal-to-noise ratio measured. The results are shown in the bottom curve on FIG. 1. It will be seen that maximum signal-to-noise ratio was reached at about 140 volts bias.

The bolometer was then aged by heating 24 hours at 44° C. and 135 v. D.C. bias. Signal-to-noise measurements were then repeated under the conditions set out above, and the result appears in the middle curve of FIG. 1. It will be noted that there is a marked increase in signal-to-noise ratio, reaching a maximum at a slightly higher bias voltage.

The bolometer was then subjected to further aging of 48 hours at 75° C. with the same bias. Again the measurements were as above, and the results appear in the uppermost curve of FIG. 1. It will be seen that the peak signal-to-noise ratio was more than three times as great.

The bolometer was then subjected to further aging, but showed no significant improvement in signal-to-noise ratio up to 96 hours. On the other hand, it was not damaged, which shows that it is not necessary to use a very sharply limited time for aging.

EXAMPLE 2

Figure 2:
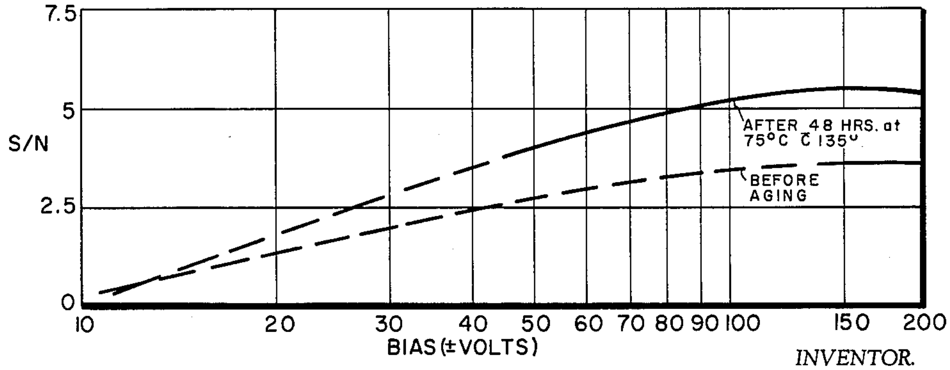
FIG. 2 is a series of curves of another thin film germanium bolometer.

Another bolometer of somewhat smaller size, 0.25 $mm.^2$, was measured for signal-to-noise ratio under the conditions of Example 1 and gave a curve slightly below that of the bolometer of Example 1. This curve is the bottom curve in FIG. 2. After heating for 48 hours at 75° C. and 135 v. D.C. bias, the upper curve in FIG. 2 was obtained.

It will be noted that this thermistor started with a somewhat lower signal-to-noise ratio, and did not show so great an increase, although even here the increase was nearly 60%. This is typical of the behavior of thermistor bolometers in the present invention. It is not possible by looking at a bolometer to tell how great an increase in signal-to-noise ratio will be obtained by heating under bias.

EXAMPLE 3

Figure 3:
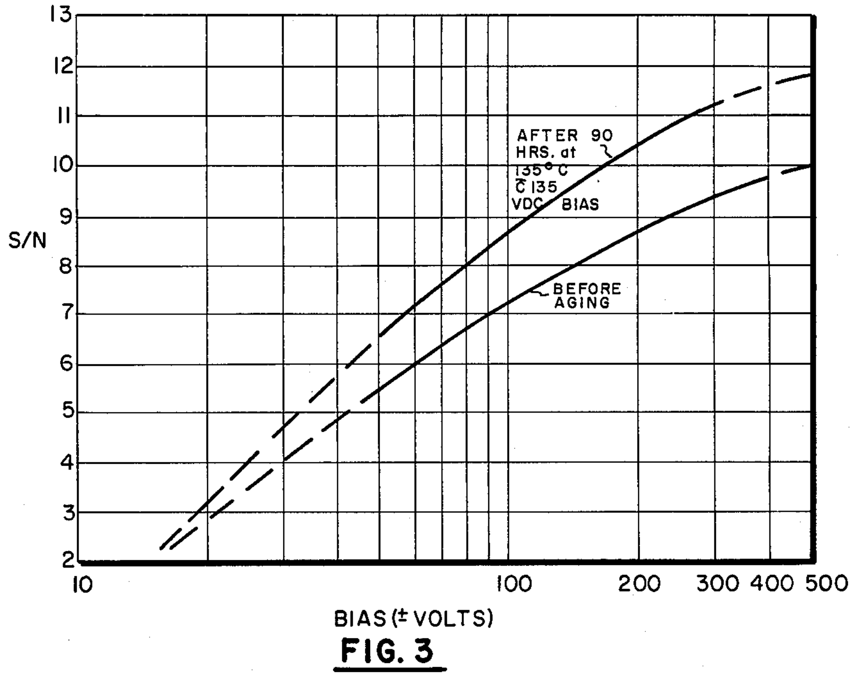
FIG. 3 is a series of curves of a thin film germanium bolometer heated at 125° C.

A third bolometer was measured and was then aged at 125° C. The curves appear in FIG. 3. It will be noted that this bolometer did not reach quite as high a signal-to-noise ratio as the bolometer of FIG. 1, Example 1, but was not as low as Example 2 in FIG. 2. The effect of the heating was a little bit faster than at 75° C., and this bolometer is a further illustration of the wide variability in response of different bolometers.

EXAMPLE 4

Figure 4:
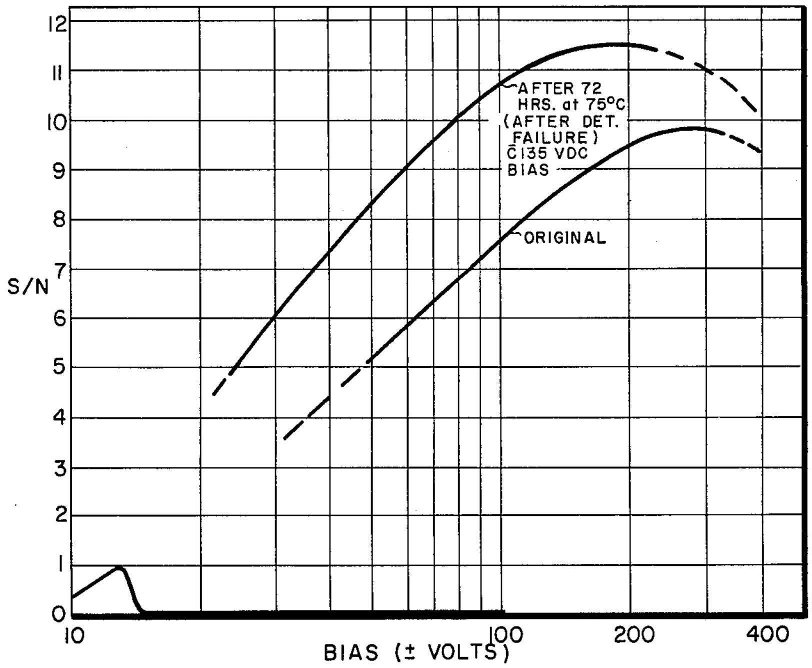
FIG. 4 is a series of curves of a damaged thermistor bolometer which is restored by heating.

A bolometer which had shown good signal-to-noise ratio was subjected to somewhat rough handling, and became damaged, showing a very high noise, such that it was completely useless. FIG. 4 shows in the bottom curve that when the bias voltage increased, the signal-to-noise ratio soon dropped to points far below unity. The bolometer was then heated for 48 hours under the conditions of Example 1, and the second curve on FIG. 4 shows the results. The bolometer regained the whole of its original signal-to-noise ratio. In fact there was a small additional improvement.

It should be noticed that the big improvement obtained by the present invention is in signal-to-noise ratio. Detectivity is higher, but responsivity drops slightly, about 10%. In other words, the improvement is in a very marked reduction in noise. However, the limit for use of a bolometer is fixed by its detectivity, and a slight decrease in responsivity is easily made up by slightly more amplification. The present invention produces bolometers having detectivities that are markedly increased, with gains in signal-to-noise ratio from nearly 60% to over 300%, and it is possible to restore damaged bolometers which have become excessively noisy.

The foregoing examples have dealt with germanium film bolometers, but similar results are obtained with polycrystalline thin film silicon bolometers. The operating parameters, of course, are different, as is normal with the different material.

I claim:

1. A method of increasing the signal-to-noise ratio of thin film semiconductor bolometers which comprises heating the bolometer at temperatures of about 40° C. to 150° C., at a bias from about 50 volts to below the voltage at which the bolometer is damaged, until the signal-to-noise ratio has reached a maximum.

2. A process according to claim 1 in which the bolometer is a thin film germanium bolometer.

3. A process according to claim 2 in which the heating is under D.C. bias.

4. A method according to claim 3 in which the D.C. bias approximates normal operating bias.

5. A method of restoring damaged thin film, polycrystalline, semiconductor bolometers which have become excessively noisy, which comprises heating the bolometer at temperatures from about 40° C. to 150° C., with a bias voltage of greater than about 50 volts and less than the peak operating voltage of the bolometer at the temperatures used, until the signal-to-noise ratio of the bolometer has been restored approximately to its original undamaged figure.

6. A process according to claim 5 in which the bolometer is a thin film germanium bolometer.

No references cited.

DAVID L. RECK, *Primary Examiner.*

C. N. LOVELL, *Assistant Examiner.*